(12) United States Patent
Johns

(10) Patent No.: US 11,793,156 B2
(45) Date of Patent: Oct. 24, 2023

(54) AMMONIA ABATEMENT FOR ANIMAL LITTER

(71) Applicant: Chemtrade Chemicals US LLC, Parsippany, NJ (US)

(72) Inventor: Rex A. Johns, Jonesboro, AR (US)

(73) Assignee: Chemtrade Chemicals US LLC, Parsippany, NJ (US)

( * ) Notice: Subject to any disclaimer, the term of this patent is extended or adjusted under 35 U.S.C. 154(b) by 288 days.

(21) Appl. No.: 17/228,163

(22) Filed: Apr. 12, 2021

(65) Prior Publication Data
US 2021/0243995 A1    Aug. 12, 2021

Related U.S. Application Data

(63) Continuation of application No. 17/132,920, filed on Dec. 23, 2020, now Pat. No. 10,973,203, which is a continuation of application No. 15/931,376, filed on May 13, 2020, now abandoned.

(60) Provisional application No. 63/115,915, filed on Nov. 19, 2020, provisional application No. 62/972,559, filed on Feb. 10, 2020.

(51) Int. Cl.
*A01K 1/015* (2006.01)

(52) U.S. Cl.
CPC .......... *A01K 1/0154* (2013.01); *A01K 1/0155* (2013.01); *A01K 2227/30* (2013.01)

(58) Field of Classification Search
CPC .............................. A01K 1/0155; A01K 1/0154
See application file for complete search history.

(56) References Cited

U.S. PATENT DOCUMENTS

| 5,176,879 | A | * | 1/1993 | White | A01K 1/0152 422/5 |
| 5,928,403 | A | * | 7/1999 | Moore, Jr. | A01K 31/17 71/21 |
| 6,468,518 | B2 | * | 10/2002 | Lind | A61L 9/01 424/76.1 |

(Continued)

*Primary Examiner* — Monica L Perry
(74) *Attorney, Agent, or Firm* — Polsinelli PC

(57) ABSTRACT

A method for preparing an ammonia abatement additive for poultry litter that is formulated to assure activation in an interior environment having various relative humidity conditions. The method includes obtaining a blended litter amendment composition that, based on weight, is about 40% deliquescent salt and about 60% aluminum sulfate, relative to a total weight of the two components. The composition can be made by the user or received, already blended, from a third party. To this blended composition that has been obtained, additional deliquescent salt is added in an amount such that the total amount of deliquescent salt is effective to activate the alum-containing ammonia abatement additive at the targeted low relative humidity condition in the interior of a poultry house. The composition is a sub-component of the ammonia abatement additive which may or may not contain additional compounds. The specified relative proportions (i.e., 40% deliquescent salt and 60% alum) only consider the proportion of deliquescent salt and the proportion of alum relative to the sum of the two components, based on weight. If there are other, extraneous compounds included in the ammonia abatement additive, those extraneous compounds are not counted in the defined and claimed proportions.

5 Claims, 1 Drawing Sheet

(56) References Cited

U.S. PATENT DOCUMENTS

| | | | |
|---|---|---|---|
| 7,617,798 B2* | 11/2009 | Stevenson | A01K 1/0154 424/76.8 |
| 8,075,876 B2* | 12/2011 | Pavlicek | A01K 1/0152 424/76.8 |
| 10,869,459 B1* | 12/2020 | Dulko | C01F 7/762 |
| 10,973,203 B1* | 4/2021 | Johns | A01K 1/0154 |
| 2002/0106344 A1* | 8/2002 | Lind | A61L 9/01 424/76.21 |

* cited by examiner

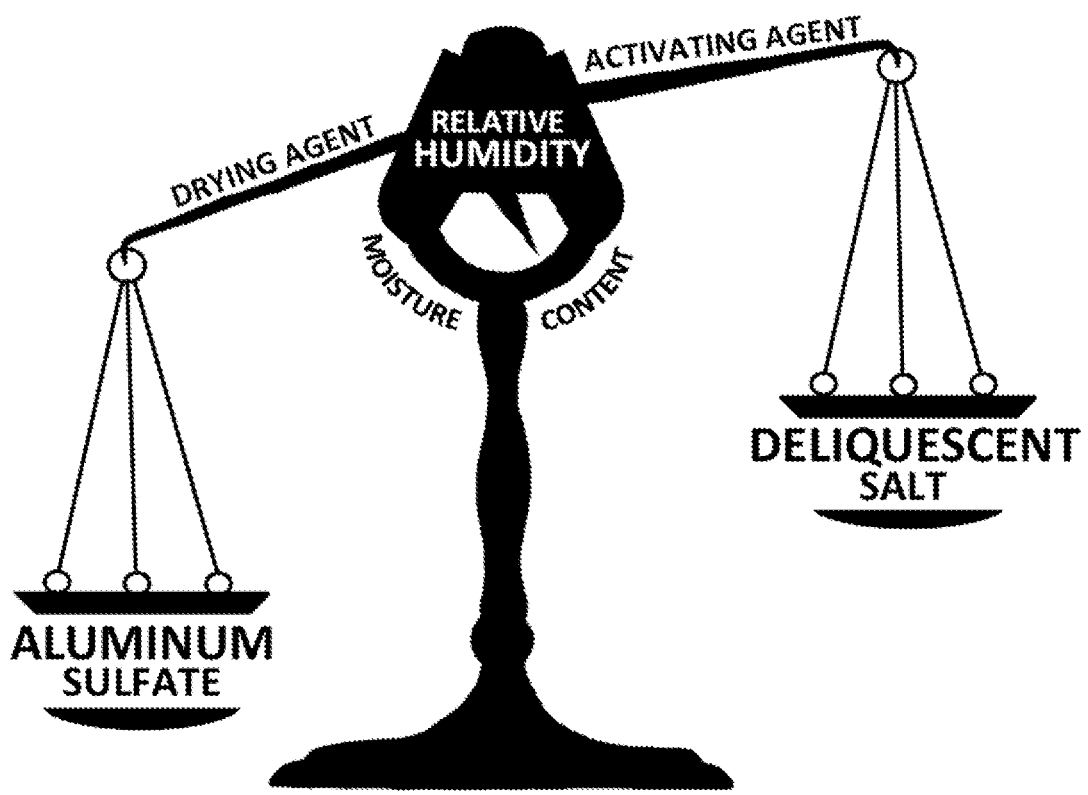

AMMONIA ABATEMENT FOR ANIMAL LITTER

CROSS-REFERENCE TO RELATED APPLICATIONS

The present application claims priority from U.S. provisional application No. 63/115,915, entitled "METHODS FOR TREATING ANIMAL LITTER," filed on Nov. 19, 2020, and is a continuation of U.S. patent application Ser. No. 17/132,920, entitled "AMMONIA ABATEMENT FOR ANIMAL LITTER," filed on Dec. 23, 2020, now U.S. Pat. No. 10,973,203, which is a continuation application of U.S. patent application Ser. No. 15/931,376, entitled "AMMONIA ABATEMENT FOR ANIMAL LITTER," filed on May 13, 2020, which claims priority from U.S. provisional application No. 62/972,559, entitled "ADAPTED DELIQUESCENT SALT AND ALUM COMPOSITION AND METHOD FOR TREATING ANIMAL WASTE-RELATED PRODUCTS," filed on Feb. 10, 2020, which are hereby incorporated by reference herein.

FIELD

The presently disclosed technology relates to improvements in the treatment of animal litter using aluminum sulfate ("alum") to reduce the generation of ammonia from animal waste in the litter. More particularly, the technology relates to the combination of a deliquescent salt with the alum to increase the presence of water in the alum and activate its ammonia abatement capabilities. In a more specific example, the technology relates to compositions and methods for adapting poultry litter located in a poultry house.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 1 shows an example of a material combination for ammonia abatement animal litter in accordance with some aspects of the present technology.

DETAILED DESCRIPTION

Within certain animal enclosures, and especially within poultry houses, high amounts of ammonia are generated that negatively affect the resident animals. The adverse effects can include such things as diminished weight gain and increased mortality among the housed animals, and especially in young chicks. To improve animal comfort and wellbeing, litter having various components is put down ahead of the animals' introduction to the space, and that initial installation of litter is typically maintained throughout their stay. To treat the litter and better alleviate the negative effects of waste-generated ammonia in the enclosure, an ammonia abatement additive is applied to the litter. According to the teachings of the presently disclosed technology, the additive includes a deliquescent salt, such as calcium chloride, blended with the alum in particular discovered and advantageous proportions, in dependence upon the measured or expected relative humidity of the intended eventual use-environment.

The alum is the compound that, when activated, neutralizes ammonia. Proper activation of the alum, however, is dependent upon sufficient moisture being present in the alum to induce its pH reducing functionality that neutralizes the offending ammonia. To gain the necessary moisture content in the alum, deliquescent salt is incorporated. Deliquescent salts, by definition, are sufficiently hydrophilic that they have a capacity to absorb enough moisture out of atmospheric air to liquefy themselves. The presence of the deliquescent salt initiates hydrolysis and increases the moisture level in the alum. A surprising discovery of the present technology is that the proportional amounts of deliquescent salt to alum correlate to expected relative humidities within an animal enclosure.

In the case of poultry houses, recent design features intended to increase the comfort and wellbeing of the birds have actually compromised the activation capabilities of the alum in the litter to abate ammonia produced by the birds' waste. A specific example is the use of "tunnel ventilation" and other enhanced air circulation methods in new poultry houses intended to cool the birds and better draw in fresh air. An unintended, but discovered consequence of this increased air circulation is an over-drying of the litter. By this applicant's research, this effect has been discovered to uniquely track the relative humidity outside the poultry house, which in turn effects the relative humidity inside the poultry house. As a result, customized blending of deliquescent salt and alum has been invented and is described and claimed herein.

Another situation that has been detected in modern poultry house constructions is over-wetting of freshly applied poultry litter under certain conditions and/or circumstances. The absorption of too much water by animal litter can have a detrimental effect because wet litter tends to reduce animal weight gain performance and provides a hospitable environment for pathogens. Wet litter also enhances the presence of pathogen vectors and attracts destructive insects such as flies and beetles that disturb the animals and reduce feed conversion to weight gain.

One such overly damp situation occurs when the slab of the poultry house is cold enough to condense moisture out of the air, wetting the surface of the concrete, and in turn, wetting litter deposited thereupon. In this regard, the amount of surface wetness correlates to the degree of relative humidity inside the poultry house. The same effect, but occurring by a different modality, is slab "weeping" of water up through the concrete from the ground below. Both situations (condensate and weeping) result in overly moist or wet litter that hampers the ability of applied alum to neutralize ammonia. To combat these effects on the alum, based on this applicant's research, unique blends of deliquescent salt in proportion to alum have been discovered and are described and claimed herein. Among other aspects, the alum content of the litter additive is increased, in correlation with the expected amount of excess moisture, thereby potentiating the alum's ammonia neutralizing capabilities.

The optimal moisture content of animal litter is generally assumed to be from about 25% to about 30%. The actual moisture content (MC) of animal litter can be determined as follows:

$$MC = [(W_o - W_a)/W_o] \times 100$$

wherein $W_o$ is wet litter weight and $W_a$ is dry litter weight. Animal litter having a moisture content from about 30% to about 35% is termed high moisture litter, and animal litter having a moisture content of about 35% or greater is termed wet litter. Excess moisture in the litter is associated with increased microbial activity in the litter, increased ammonia emissions, increased odor emissions, increased contact dermatitis in the animals, and may negatively affect the feed conversion ratio and carcass yields.

Animal litter having a moisture content from about 20% to about 25% is termed low moisture litter, and animal litter having a moisture content of about 20% or less is termed dry litter. Low moisture levels in the litter can be associated with respiratory diseases, dehydration of young animals, and/or reduced air quality in the animal facility.

Another measure of moisture in litter is water activity ($A_w$), which is a thermodynamic property that has been shown to be more closely related to microbial, chemical and physical properties of natural products than moisture content. $A_w$ relates to the relative freedom or availability of water in a sample and its tendency to escape. $A_w$ is defined as the ratio of the fugacity of water in a system, and the fugacity of pure liquid water at the same temperature, where fugacity is a measure of the escaping tendency of a substance. $A_w$ provides a measure of the thermodynamic forces driving the movement of water within and between media (including air). Water will migrate from higher $A_w$ to lower $A_w$ until equilibrium is achieved and $A_w$ is constant throughout the system (assuming isothermal conditions). $A_w$ has been shown to be related to physical handling properties of litter including cohesion, adhesion, compressibility and flowability. Further, it was been shown that maintaining litter below a critical $A_w$ value (e.g., less than about 0.84) corresponds with reduced growth of pathogens such as *Salmonella* and *Escherichia coli*.

Regarding the compositional blends and blending of the deliquescent salt and alum, it is contemplated that the specially designed mixtures of the two components can be mixed together before application to the litter or individually (sequentially or simultaneously) added to the litter. Regardless, the components are ultimately in combination on the target media, such as animal litter.

Suitable litter compositions or media can include mixtures comprising (meaning includes, but is not limited to) one or more of wood shavings, secondary paper, nut hulls, bran hulls, rice hulls, wood chips, sand and sawdust as examples. Further examples are particle board residue, wheat chips, bean straw, oat straw, wheat straw, hay, corn cobs, corn stover, soybean residue, soybean stubble, rice straw, bean straw, *miscanthus* grass, switch grass, Indian grass, big bluestem grass, prairie grasses, oat hulls, rice hulls, nut hulls, peanut hulls, sugar cane pulp, kenaf core, kenaf residue, feathers, peat moss, shredded paper, recycled paper, recycled cardboard, sand, composted municipal garbage, dried compost, or combinations of any of the above. Other materials are known to those skilled in the art.

Suitable deliquescent materials include chlorides such as magnesium chloride, calcium chloride, manganese chloride, ferric chloride and zinc chloride; and other metal salts including ammonium citrate, calcium chlorate, calcium iodide, calcium nitrite, calcium nitrate, cobaltous ammonium chloride, cobaltous iodide, cupric chlorate, cupric nitrate, ferric chloride, ferric lactate, ferric nitrate, ferrous iodide, magnesium ammonium chloride, magnesium nitrate, magnesium nitrite, manganese oxide, manganese sulfate, phosphoric acid, phosphorus oxide, potassium acetate, potassium carbonate, potassium iodide, potassium phosphate, sodium bisulfate, sodium acetate, stannic sulfate and zinc chloride.

Deliquescent salts including calcium chloride, magnesium chloride, sodium bisulfate, manganese chloride, zinc chloride, anhydrous ferric chloride, magnesium nitrate, calcium nitrate, potassium acetate and sodium acetate, are preferred. Since some of these deliquescent salts may have adverse effects on some animals, such as poultry chicks, the types of the salts must be carefully selected. The addition of the deliquescent material is also regarded as aiding control of nuisance dust in the animal housing. Calcium chloride, being a very effective deliquescent material, absorbs moisture from the atmosphere, even very dry atmospheres, until a solution is formed; this absorbed water becomes the activator for alum.

The following are example embodiments that are within the scope of this disclosure. Other, different and/or broader embodiments are also within the scope of this disclosure, some of which can include elements of one example embodiment combined with elements of another example embodiment (to the extent combinable), or subsets of elements of one or another specific example embodiment.

In a first characterization, the presently disclosed technology takes the form of a method for preparing an ammonia abatement additive for poultry litter that is formulated to assure activation in an interior environment having a low relative humidity which is being targeted for ammonia abatement activation. That is to say, a poultry house will be located in a climate and location having ambient (outdoor) characteristics that influence the conditions of the house's interior environment, but they will not necessarily be identical. Because it is within the interior environment that the animals are actually raised, the present technology is concerned with the relative humidity of that interior space, and in particular, the interior space of a poultry house in which the relative humidity prior to the birds' occupation is low, and that degree of relative humidity is considered "targeted" because it is the relative humidity under which the ammonia abatement additive will desirably perform.

As represented in FIG. 1, the presently described technology comprises obtaining a blended litter amendment composition that, based on weight, is about 40% deliquescent salt and about 60% aluminum sulfate, relative to a total weight of the two components. The composition is characterized as being "obtained" because it is contemplated that the blended composition may be made by the user or received, already blended, from a third party. To this blended composition that has been obtained, additional deliquescent salt is added in an amount such that the total amount of deliquescent salt is effective to activate the alum-containing ammonia abatement additive at the targeted low relative humidity condition in the interior of a poultry house. The "composition" is a sub-component of the "ammonia abatement additive" which may or may not contain additional compounds. The specified relative proportions (i.e., 40% deliquescent salt and 60% alum) only consider the proportion of deliquescent salt and the proportion of alum relative to the sum of the two components, based on weight. If there are other, extraneous compounds included in the ammonia abatement additive, those extraneous compounds are not counted in the defined and claimed proportions.

In one example, the amount of additional deliquescent salt is sufficient to bring a resulting adjusted litter amendment composition to about 60% deliquescent salt compared to about 40% aluminum sulfate. In this instance, the resulting adjusted litter amendment composition corresponds to a targeted low relative humidity interior environment having about 45% or less relative humidity.

Thereafter, the adjusted litter amendment composition is applied to poultry litter that has been determined to have a moisture content corresponding to an interior environment having about 45% relative humidity. To obtain such correspondence, the relative humidity of the interior environment of the poultry house is measured. As an example, a capacitive humidity sensor can be employed to measure the interior relative humidity and which does so utilizing a thin strip of metal oxide between two electrodes and the metal oxide's electrical capacity changes indicate the atmosphere's relative humidity.

In another example, the amount of additional deliquescent salt is sufficient to bring a resulting adjusted litter amendment composition to about 70% deliquescent salt compared to about 30% aluminum sulfate. In this instance, the resulting adjusted litter amendment composition corresponds to a targeted low relative humidity interior environment having about 40% or less relative humidity.

In yet another example, the amount of additional deliquescent salt is sufficient to bring a resulting adjusted litter amendment composition to about 80% deliquescent salt compared to about 20% aluminum sulfate. In this instance, the resulting adjusted litter amendment composition corresponds to a targeted low relative humidity interior environment having about 35% or less relative humidity.

In still another example, the amount of additional deliquescent salt is sufficient to bring a resulting adjusted litter amendment composition to about 90% deliquescent salt compared to about 10% aluminum sulfate. In this instance, the resulting adjusted litter amendment composition corresponds to a targeted low relative humidity interior environment having about 30% or less relative humidity.

In yet, still another example, the amount of additional deliquescent salt is sufficient to bring a resulting adjusted litter amendment composition to about 50% deliquescent salt compared to about 50% aluminum sulfate. In this instance, the resulting adjusted litter amendment composition corresponds to a targeted low relative humidity interior environment having about 50% or less relative humidity.

In a second characterization, the presently disclosed technology takes the form of a method for providing an ammonia abatement additive for poultry litter that is formulated to activate prior to the introduction of poultry onto the litter. The method comprises providing an amount of deliquescent salt having a first weight and providing an amount of aluminum sulfate having a second weight, and wherein the amount of aluminum sulfate is about one and one-half times the amount of deliquescent salt, based on weight.

In one example, the ammonia abatement additive for poultry litter is formulated to activate in average US relative humidity. For present purposes, average US relative humidity is considered to be about 60% relative humidity.

In another example, the additional amount of provided aluminum sulfate is approximately equal to twice the amount of already-provided deliquescent salt, based on weight. In this case, the additional amount of aluminum sulfate is provided in correspondence with a use-environment of greater than 70% relative humidity.

In yet another example, the additional amount of provided aluminum sulfate is approximately equal to three times the amount of already-provided deliquescent salt, based on weight. In this case, the additional amount of aluminum sulfate is provided in correspondence with a use-environment of greater than 80% relative humidity.

In still another example, the additional amount of provided aluminum sulfate is approximately equal to four times the amount of already-provided deliquescent salt, based on weight. In this case, the additional amount of aluminum sulfate is provided in correspondence with a use-environment of greater than 90% relative humidity.

In the second characterization disclosed above, the deliquescent salt constitutes about 40% and the aluminum sulfate constitutes about 60% of the combination of the two components.

In an additional characterization, the presently disclosed technology takes the form of a method for providing an ammonia abatement additive for poultry litter that is formulated to activate prior to the introduction of poultry onto the litter. The method comprises providing an amount of aluminum sulfate having a first weight and providing an amount of deliquescent salt having a second weight, and wherein the amount of aluminum sulfate is about nine times the amount of deliquescent salt, based on weight. This combination has been found to be particularly useful when the alum has not been activated until shortly before chick introduction.

Related Embodiments Described in Terms of Comprising Activating Agent and Drying Agent Alternatively, the litter amendment can be characterized as comprising an activating agent and a drying agent as depicted in FIG. 1. The activating agent is an acid having a pKa of about 3 or less. Suitable acids include, without limit, benzenesulfonic acid, chloric acid, chromic acid, ethanesulfonic acid, fluoroboric acid, fluorosulfuric acid, hexafluorophosphoric acid, hydrochloric acid, hydrobromic acid, hydroiodic acid, methanesulfonic acid, nitric acid, perchloric acid, periodic acid, permanganic acid, phosphoric acid, sulfuric acid, p-toluenesulfonic acid, trifluoromethanesulfonic acid, and combinations thereof. In some embodiments, the activating agent may be sulfuric acid, hydrochloric acid, phosphoric acid, nitric acid, perchloric acid, or a combination thereof. In specific embodiments, the activating agent acid may be sulfuric acid.

The amount of activating agent present in the litter amendment can and will vary depending upon a variety of factors such as, e.g. the moisture content of the animal litter.

The drying agent in the litter amendment comprises a metal salt. Suitable metal salts include, without limit, aluminum sulfate, aluminum chloride (basic), aluminum oxide, aluminum hydroxide, ferric aluminum sulfate, ferric chloride, ferrous chloride, ferric sulfate, ferrous sulfate, or combinations thereof. In some embodiments, the drying agent may be aluminum sulfate, ferric aluminum sulfate, aluminum chloride (basic), ferric chloride, ferrous chloride, ferric sulfate, ferrous sulfate, or combination thereof. In specific embodiments, the drying agent may be aluminum sulfate. The aluminum sulfate may be expressed as a stoichiometric equivalent to a hydrated form of aluminum sulfate ($Al_2(SO_4)_3 \cdot n\ H_2O$, wherein n is an integer from 12 to 18), or an anhydrous form of aluminum sulfate.

The amount of drying agent present in the litter amendment can and will vary depending upon a variety of factors such as, e.g. the moisture content of the animal litter.

In some embodiments, the litter amendment may be formulated as a liquid composition. The liquid composition may further comprise water. The water may be tap water, process water, rain water, spring water, well water, storm water, river water, pond water, lake water, acid water, alkaline water, purified water, or distilled water. An exemplary liquid litter amendment consists of sulfuric acid, aluminum sulfate, and water.

In other embodiments, the litter amendment may be formulated as a dry composition. The dry composition may further comprise one or more inert ingredients. Exemplary inert ingredients include starches, celluloses, clays, bentonite, diatomaceous earth, talc, kaolin, lime, soda ash, silicon dioxide, or combinations thereof.

In general, the litter amendment has a pH of about 6.0 or less. In some embodiments, the litter amendment has a pH of less than 6.0, less than 5.0, less than 4.0, less than 3.0, less than 2.0, less than 1.0, or less than 0.5.

This method comprises applying a litter amendment comprising an activating agent and a drying agent to the animal litter, wherein the litter amendment comprises amounts of the activating agent and the drying agent that vary as a function of moisture content of the animal litter. As such, the method comprises determining or estimating the moisture content of the animal litter and adjusting the ratio of activating agent to drying agent according to the moisture content of the animal litter. Typically, the lower the moisture content of the animal litter, the higher the ratio of activating agent to drying agent and/or the higher the moisture content of the animal litter, the lower the ratio of activating agent to drying agent.

In embodiments in which the moisture content of the animal litter is less than 25%, the litter amendment comprises a higher ratio of activating agent to drying agent. For example, the litter amendment comprises from about 1.30 mole to about 7.62 moles of the activating agent per 1.0 mole of the drying agent. In various embodiments, the mole to mole ratio of the activating agent to the drying agent may be about 1.3:1, about 1.5:1, about 1.5:1, about 2.0:1, about 2.2:1, about 2.5:1, about 3:1, about 4:1, about 5:1, about 6:1, or about 8:1. In certain embodiments, the mole to mole ratio of the activating agent to the drying agent may range from about 1.3:1 to about 1.5:1, from about 1.5:1 to about 1.8:1, from about 1.8:1 to about 2.2:1, from about 2.2:1 to about 2.8:1, or from about 2.8:to about 3.5:1. In embodiments in which the moisture content of the animal litter is less than 25%, the activating agent is sulfuric acid, and the drying agent is aluminum sulfate, the litter amendment comprises about 1.3 to about 2.2 moles of sulfuric acid per 1.0 moles of aluminum sulfate.

In embodiments in which the moisture content of the animal litter ranges from about 25% to about 30%, the litter amendment comprises from about 1.07 to about 1.28 moles of the activating agent per 1.0 mole of the drying agent. In some embodiments, the mole to mole ratio of the activating agent to the drying agent may be about 1.08:1, about 1.00:1, about 1.12:1, about 1.14:1, about 1.16:1, about 1.18:1, about 1.20:1, about 1.22:1, about 1.24:1, about 1.26:1, or about 1.28:1. In various embodiments, the mole to mole ratio of the activating agent to the drying agent may range from about 1.07:to about 1.10:1, from about 1.10:1 to about 1.15:1, from about 1.15:1 to about 1.20:1, from about 1.20:1 to about 1.25:1, or from about 1.25:1 to about 1.28:1. In embodiments in which the moisture content of the animal litter is from about 25% to about 30% the activating agent is sulfuric acid, and the drying agent is aluminum sulfate, the litter amendment comprises about 1.07 to about 1.28 moles of sulfuric acid per 1.0 mole of aluminum sulfate.

In embodiments in which the moisture content of the animal litter is greater than 30%, the litter amendment comprises a lower ratio of activating agent to drying agent. In various embodiments, the litter amendment comprises from about 0.03 to about 1.06 moles of the activating agent per 1.0 mole of the drying agent. In various embodiments, the mole to mole ratio of the activating agent to the drying agent may be about 1.03:1, about 0.1:1, about 0.2:1, about 0.4:1, about 0.6:1, about 0.8:1, or about 1.0:1. In certain embodiments, the mole to mole ratio of the activating agent to the drying agent may range from about 0.03:1 to about 0.1:1, from about 0.1:1 to about 0.4:1, from about 0.4:1 to about 0.6:1, from about 0.6:1 to about 0.8:1, or from about 0.8:1 to about 1.06:1. In embodiments in which the moisture content of the animal litter is greater than 30%, the activating agent is sulfuric acid, and the drying agent is aluminum sulfate, the litter amendment comprises about 0.39 to about 1.06 moles of sulfuric acid per 1.0 moles of aluminum sulfate.

The amount of the litter amendment applied to the animal litter can and will vary depending, for example, upon the temperature and amount of ventilation in the animal facility, the depth, and/or age of the animal liter. In embodiments in which the litter amendment is a liquid composition, the liquid composition may be applied at a rate from about 0.25 gallon to about 1 gallon per 100 ft$^2$, from about 1 gallon to about 2 gallons per 100 ft$^2$, from about 2 gallons to about 3 gallons per 100 ft$^2$, or from about 3 gallons to about 6 gallons per 100 ft$^2$ of surface area. In embodiments, in which the litter amended is a dry composition, the dry composition may be applied at a rate from about 0.5 to 2 lbs per 100 ft$^2$, from about 2 to 4 lbs per 100 ft$^2$, from about 4 to 6 lbs per 100 ft$^2$, from about 6 to 8 lbs per 100 ft$^2$, from about 8 to 10 lbs per 100 ft$^2$, from about 10 to 12 lbs per 100 ft$^2$, from about 12 to 15 lbs per 100 ft$^2$, from about 15 to 20 lbs per 100 ft$^2$, or from about 20 to 30 lbs per 100 ft$^2$ of surface area.

The liquid composition may be applied to the animal litter using a spot sprayer, a boom sprayer, a mist sprayer, a hitch sprayer, a backpack sprayer, a tow sprayer, a boomless sprayer, a stationary or moving sprayer system affixed to the animal facility, or any other sprayer device known in the field. The dry composition may be applied to the animal litter using a spinner spreader, a broadcast spreader, a drop spreader, a lime spreader, a litter spreader, a fertilizer spreader, or any other spreader know in the field.

The frequency of application of the litter amendment will vary depending, for example, upon the age, depth, and/or density of the animal litter. In some embodiments, the litter amendment may be applied every month, every two months, every three months, every six months, every year, every two years, and so forth.

The animal litter treated by the methods described herein may be from livestock animals such as poultry (e.g., boilers, turkeys, ducks, geese, pheasants, game birds, layers, etc.), cattle (e.g., dairy, beef, veal, etc.), pigs, sheep, and goats; companion animals such as cats, dogs, horses, rodents (e.g., mice, rats, hamsters, gerbils, guinea pigs), and the like; zoo animals such as monkeys, chimpanzees, lions, tigers, elephants, giraffes, and so forth; or research animals such as mice, rats, and the like. In specific embodiments, the animal litter may be poultry litter or chicken litter.

The activating agent/acid in the litter amendment provides an immediate source of protons, thereby immediately acidifying or lowing the pH of the animal litter. In general, the pH of the litter is reduced to a level of less than about 6.0, less than about 5.0, less than about 4.0, less than about 3.0, or less than about 2.0. The protons also react with (or bind) volatile ammonia ($NH_3$) to form non-volatile ammonium ($NH_4$). Ammonium is a highly reactive cation that bonds with sulfates, nitrates, phosphates, or other anions to form ammonium salts. For example, ammonium ions can react with sulfates to form ammonium sulfate, a water soluble nitrogen fertilizer. The presence of ammonium salts in animal litters improves their nutrient value use as fertilizers. The drying agent/metal salt in the litter amendment undergoes hydrolysis to form buffered metal hydroxide intermediates and protons. The metal hydroxide intermediates can react with the activating agent (e.g., sulfuric acid) to form acidic metal sulfates, which are then hydrolyzed to form buffered metal hydroxide intermediates and additional protons. The continued generation of protons maintains the animal litter a low pH and controls ammonia volatilization.

Minimizing ammonia volatilization also reduces the levels of airborne ammonia in animal facilities. The generally recognized acceptable level of airborne ammonia in animal facilities is about 25 parts per million (ppm) or less. In some embodiments, the level of ammonia in the animal facility may be less than about 25 ppm, less than about 20 ppm, less than about 15 ppm, less than about 10 ppm, less than about 5 ppm, or less than about 1 ppm. Ammonia levels may be monitored and measured by a variety of means. Suitable means include ammonia meters, ammonia detection devices, ammonia sensors, ammonia gas monitors, colorimetric test strips, colorimetric paper, passive colorimetric tube detectors for ammonia, active colorimetric tubes for ammonia, and other detection means well-known in the art. In general, animal facilities treated with the composition have lower levels of airborne ammonia than comparable untreated animal facilities.

Reducing airborne ammonia levels in animal facilities, therefore, improves air quality in animal facilities. Improved air quality (i.e., low ammonia levels) improves the quality of life for animals housed in the animal facility and reduces the physiological stress of the animals. Animals with reduced stress generally have increased weight gain, better feed conversion ratios, increased productivity (e.g., increased egg production, increased milk production, etc.) and/or fewer infections or diseases than stressed animals. Improved air quality (e.g., low ammonia levels) also provides better working conditions for the animal facility workers. Reducing the levels of airborne ammonia may also reduce the amount of energy needed to ventilate and/or heat the animal facilities. Lastly, inhibiting ammonia volatilization may also reduce odor from animal litter and/or animal facilities.

Animal litter also contains soluble phosphorus that can enter the aquatic groundwater system from fields receiving untreated animal litter. Phosphorus runoff is the primary cause for eutrophication in lakes and other freshwater bodies. The soluble phosphorous in the animal litter can react with the metal of the metal salt of the litter amendment to form insoluble metal phosphates. For example, phosphorus in the animal litter can react with aluminum to form aluminum phosphate. Thus, this method of treating animal litter also reduces runoff of soluble phosphorous as compared to untreated animal litter.

This method of treating animal litter can also adjust or maintain the moisture content of the animal litter within an optimal range. In some embodiments, the animal litters treated as described herein may have moisture contents that range from about 20% to about 35%, or more preferably from about 25% to about 30%.

Although the present technology has been described in terms of specific components and relative amounts thereof, other additives can be included as will be known to one skilled in the art. Thus the disclosed technology is only meant to be limited by the scope of the appended claims.

What is claimed is:

1. A method for providing an ammonia abatement additive for poultry litter that is formulated to activate prior to introduction of poultry onto the litter, the method comprising:
   prior to the introduction of poultry onto the litter in an interior space, determining relative humidity of the interior space;
   providing an amount of deliquescent salt having a first weight; and
   providing an amount of aluminum sulfate having a second weight, wherein the amount of aluminum sulfate and the amount of deliquescent salt are based on a predetermined proportion of each of the amount of deliquescent salt and the amount of aluminum sulfate relative to a sum of the weights of the deliquescent salt and aluminum sulfate, wherein each predetermined proportion corresponds to the relative humidity of the interior space.

2. The method as recited in claim 1, further comprising:
   providing the amount of aluminum sulfate as about one and one half times the amount of deliquescent salt after determining the relative humidity is greater than 60% and less than 70%.

3. The method as recited in claim 1, further comprising:
   providing the amount of aluminum sulfate as about two times the amount of deliquescent salt after determining the relative humidity is greater than 70% and less than 80%.

4. The method as recited in claim 1, further comprising:
   providing the amount of aluminum sulfate as about three times the amount of deliquescent salt after determining the relative humidity is greater than 80% and less than 90%.

5. The method as recited in claim 1, further comprising:
   providing the amount of aluminum sulfate as about four times the amount of deliquescent salt after determining the relative humidity is greater than 90%.

* * * * *